CARTRIDGE CASE

Filed Sept. 7, 1965

INVENTORS
THOMAS SCHINNERER
HANS UMBACH
ERNST FRÖBEL, Deceased
By ELISE FRÖBEL and
ERNST GUNTER FRÖBEL,
Heirs.
BY Dicke + Craig
ATTORNEYS

United States Patent Office 3,352,239
Patented Nov. 14, 1967

3,352,239
CARTRIDGE CASE

Thomas Schinnerer, Furth, Bavaria, and Hans Umbach, Stadeln uber Nurnberg, Germany, and Ernst Fröbel, deceased, late of Furth, Bavaria, Germany, by Elise Fröbel, Furth, Bavaria, and Ernst Günter Fröbel, Nurnberg, Germany, heirs, assignors to Dynamit Nobel Aktiengesellschaft, Troisdorf, Germany Filed Sept. 7, 1965, Ser. No. 485,642
9 Claims. (Cl. 102—43)

ABSTRACT OF THE DISCLOSURE

The present disclosure relates to a closure for a buckshot or shotgun cartridge having a plastic closure disk covering the buckshot where the closure disk is provided with a forwardly and rearwardly extending tubular portion from the rim of its web portion. The forwardly extending portion is engaged on three sides by the forward reversely bent flange of the cartridge case and the closure disk is symmetrical about a plane perpendicular to the cartridge axis. The closure disk is provided with raised and weakened portions for identification marks and to assure the rupture of the closure disk into predetermined pieces during firing.

It is normally required of buckshot cartridges that they to a high degree be impermeaable to moisture and watertight. These requirements are satisfied to a sufficient extent, both with the quite well known cartridge cases made of cardboard as also by the more recently used cartridge cases made of plastic material, in the case of the former by impregnating, and in the case of the latter even without any special measures. However, considerable difficulties are still encountered, now as heretofore, to achieve with these known types of closure arrangements a completely satisfactory closure of the cartridge cases as regards imperviousness to moisture and water-tightness.

The present invention is concerned with a so-called rim closure arrangement utilized in numerous instances, in which the buckshot balls are covered by means of a thin disk inserted at the forward end of the cartridge case and held in its position by the inwardly bent or flanged-over rim of the cartridge case. More particularly, the present invention aims at eliminating with this type of rim closure arrangement the aforementioned difficulties and shortcomings. This is achieved according to the proposal of the present invention in that the closure disk is manufactured of plastic material, preferably of thermoplastic material, especially of polystyrene, or impact-resistant polystyrene and is so constructed as to be provided on the side facing the forward end of the case along the rim thereof with an annularly shaped, cylindrical extension or projection extending in the axial direction, by means of which it engages in sealing abutment on both sides into the bent-or flanged-over rim of the cartridge case mouth. In this manner, on the one hand, a labyrinth-like seal is achieved whose effectiveness can be further enhanced in that the closure disk is pressed with a tight fit into the cartridge case mouth prior to the flanging- or bending-over of the cartridge case mouth and, on the other, a protective opening of the flanged-over portion of the cartridge case mouth is achieved by means of the cylindrical rim since this rim is not destroyed but is lifted out as a whole when, during firing, the flat plane part of the disk is driven out by the buckshot balls seeking to leave the cartridge case and thereby disintegrates. This rim acts at the same time also as reinforcement and/or protection of the cartridge case wall within the area of the cartridge case mouth, which can be further improved in that the annularly shaped rim of the closure disk is also extended toward the rear, i.e., in the direction toward the balls.

According to an appropriate feature and further development of the present invention it is proposed to provide the flat part of the closure disk with recesses, weakening lines or the like, serving as intentional breaking or rearing place, whereby there is achieved not only a facilitated disintegration of the plane or flat part of the closure disk but also especially such as will result into a large number of pieces of predetermined size so that no danger exists that, during firing, the flat part of the disk breaks off as a whole from the rim and flies in the center of the buckshot charge in front of the buckshot balls in a disturbing manner.

Insofar as the closure disk is provided only on one side with intentional breaking places, it is recommended to accommodate or arrange the same on the outwardly facing side thereof. By different constructions of the recesses, weakening lines or the like, it is thereby possible to achieve at the same time a marking and identification of different types of buckshot cartridge cases capable of being recognized by touch whereby the hunter can determine also during twilight or in the dark by touching the cartridges which type of cartridge is involved in each instance. These measures can be further completed in that the cover or closure disks are given different colors for easy differentiation of different types of cartridges during good visibility conditions. Insofar as no intentional breaking places are provided or also in case when no differentiation by touch of different types of cartridges is intended therewith, the identification can be achieved also, of course, by means of reinforcements, embossments, ribs or the like, accommodated on the outside of the closure disk. It is appropriate to construct the closure disk symmetrically to the center plane thereof extending perpendicular to its axis since an oriented assembly and installation of the disk into the cartridge case is obviated thereby.

Accordingly, it is an object of the present invention to provide a buckshot cartridge case of the type described above which obviates, by extremely simple means, the aforementioned shortcomings and drawbacks encountered with the prior art constructions.

It is another object of the present invention to provide a buckshot cartridge case having a rim closure means which achieves a closure of the cartridge case that is completely satisfactory as regards non-premeability to moisture and water tightness.

A further object of the present invention resides in the provision of a rim closure arrangement for buckshot cartridge cases which achieves a labyrinth-like seal and at the same time assures a protected opening of the rim closure along the cartridge case mouth without destruction of the rim.

Still another object of the present invention resides in a rim closure arrangement for buckshot cartridge cases in which the rim is lifted as a whole when during firing, the flat part of the closure disk disintegrates by the forces of the forwardly propelled balls.

A still further object of the present invention resides in the provision of a rim closure arrangement for buckshot cartridge cases in which the cartridge case wall is reinforced and protected within the area of the cartridge case mouth.

Another object of the present invention resides in a buckshot cartridge case having a rim closure arrangement which not only achieves all of the aforementioned objects and advantages but which additionally brings about a disintegration of the plane portion of the closure disk into a large number of pieces of predetermined size thereby eliminating the danger of disturbing the proper flight of the buckshot balls.

A still further object of the present invention resides in the provision of a buckshot cartridge case of the type described above which utilizes the particular construction of the rim closure arrangement to permit differentiation, by touch, between the different types of buckshot cartridges without visible inspection thereof.

These and further objects, features and advantages of the present invention will become more obvious from the following description when taken in connection with the accompanying drawing which shows, for purposes of illustration only, several embodiments in accordance with the present invention, and wherein.

FIGURES *4a*, *4b*, *4c* and *4d* are axial cross sectional views through different embodiments for the construction of the closure disks in accordance with the present invention;

FIGURES *5a*, *5b*, *5c* and *5d* are top plan views on closure disks in accordance with the present invention provided with recognition marks for identifying the type of buckshot and charge of the cartridge, and FIGURES *5e* and *5f* are axial cross sectional views through the closure disks of FIGURES *5b* and *5c*, respectively.

Figure 1:
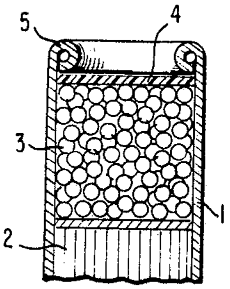
FIGURE 1 is an axial cross sectional view through a prior art rim closure arrangement for cardboard cartridge cases.

Referring now to the drawing wherein like reference numerals are used throughout the various views to designate like parts, and more particularly to FIGURE 1, which illustrates a prior art arrangement, the usual buckshot balls 3 are arranged in this embodiment within the cartridge case 1 in front of the sealing plug 2. The buckshot balls 3 are covered against the forward end of the cartridge by means of the disk 4 which is held and sealed by the inwardly flanged or bent cartridge case mouth 5.

Figure 2:
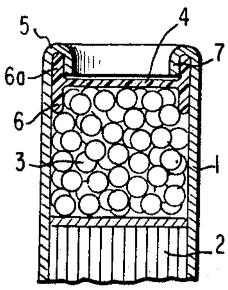
PRIOR ART FIG.2
FIGURE 2 is an axial cross sectional view through a rim closure arrangement in accordance with the present invention with a closure disk engaging into the flanged-over rim.

According to FIGURE 2, illustrating one embodiment in accordance with the present invention, the closure disk 4 is provided with an annularly shaped cylindrical rim 6 extending, in the axial direction, both toward the front as well as toward the rear end of the cartridge case 1 which rim 6 abuts with its outer surface sealingly against the interior walls of the cartridge case 1 and projects with the part thereof extending toward the forward end of the cartridge case into the turned or flanged-over rim of the cartridge case mouth 5 whereby the inwardly bent part 7 thereof abuts sealingly against the inner surfaces of the forward rim part 6*a*.

Figure 3:
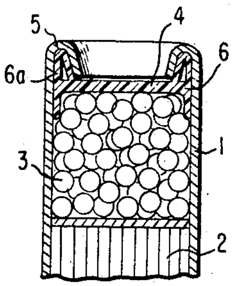
FIGURE 3 is an axial cross sectional view through another modified embodiment of a rim closure mechanism having a flanged-over rim on the closure disk itself.
Figure 4A:
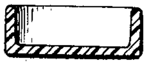
Figure 4B:
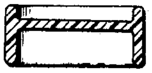
Figure 4C:
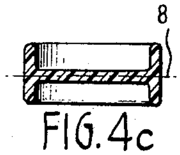
Figure 4D:
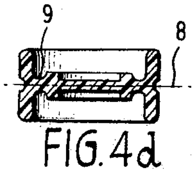
Figure 5A:
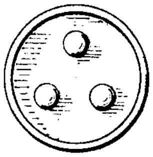
Figure 5B:
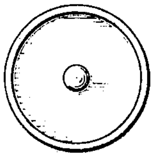
Figure 5C:
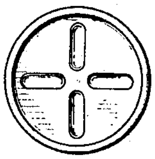
Figure 5D:
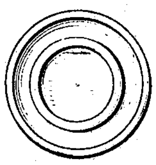
Figure 5E:
Figure 5F:
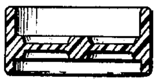

Also in the embodiment of FIGURE 3, the rim 6 extends axially toward both sides of the disk 4. However, the part 6*a* of the rim 6 disposed in the direction toward the front end of the cartridge case 1 is constructed in this embodiment of greater length and is flanged over inwardly together with the forward end of the cartridge case 1 whereby a still better seal is produced between the disk 4 or the rim part 6*a* and the cartridge case 1 or cartridge case mouth 5.

Both in the embodiment of FIGURE 2 as well as that of FIGURE 3 an erecting or straightening force is exerted on the inwardly flanged-over part of the cartridge case mouth 5 by the flat plane disk portion breaking loose during firing under the effect of the driven out buckshot balls seeking to leave the cartridge case, which force is replaced in the further course of the firing operation by a force exerted by the annular rim 6 when the rim 6, remaining integral while the center part of the disk 4 breaks out, is also driven out of the cartridge case 1 under the effect of the expelled buckshot balls and/or the plug 2 driven out behind the balls. Up to the complete discharge of the rim 6 out of the cartridge case 1, the cartridge case mouth 5 is thereby practically always covered with respect to the buckshot balls by the rim 6, which results in a safe opening of the cartridge case mouth 5 protected against damage.

As shown in FIGURES *4a–4d* the closure disk 4 can be constructed in different ways, for example, such that the rim extends only toward the front side of the disk, i.e. extends only toward the forward end of the cartridge (FIG. *4a*), or extends only with the smaller part of its axial extent toward this side (FIGURE *4b*). It is, however, particularly appropriate to construct the closure disk 4 symmetrically with respect to the center plane 8 thereof (FIGURES *4c* and *4d*) whereby the need for an oriented installation of the disk into the cartridge case can be avoided in an advantageous maner. By different types of raised or embossed markings (FIGURE *4d*) there may be achieved a recognition by touch only of different types of cartridge cases.

With a corresponding, especially with a sufficiently deep and narrow construction of the annularly shaped notching 9, illustrated in FIGURE *4d*, the notching 9 may also be used to hold the flanged-over cartridge case rim against an unintentional re-erection or straightening up.

Some further examples of markings recognizable by touch are illustrated in FIGURES *5a–5f* whereby it may be noted that there markings may be accommodated on one as well as on both sides of the disk 4. Instead of constructing the markings as raised parts, corresponding recesses may also be provided which can serve either at the same time or only as intentional breaking places.

While we have shown and described several embodiments in accordance with the present invention, it is understood that the same is not limited thereto but is susceptible of numerous changes and modifications as known to a person skilled in the art and we therefore do not wish to be limited to the details shown and described herein but intend to cover all such changes and modifications as are within the scope of the appended claims.

We claim:

1. A cartridge, comprising: a generally tubular cartridge case having an axis, a forward discharging end and a rearward ignition end; a propellant charge in said case; buckshot in said case forwardly of said charge; a synthetic polymer closure disk closing said case forwardly of said buckshot, having a web portion, a forward tubular portion extending from the rim of said web portion, and a rearward tubular portion extending from the rim of said web portion; said disk being symmetrical with respect to a plane extending through said web portion and perpendicular to the axis of said case so that said disk may be inserted in said case without orientation; said case having a forward U-cross sectional shaped annular portion reversely flanged and engaging said forward tubular portion on opposite sides to provide a labyrinth type forward seal.

2. The cartridge of claim 1, wherein said web portion has raised marking means for identifying the cartridge by touch.

3. The cartridge according to claim 1, including stress concentrating means for separating said web portion from said forward and rearward tubular portions upon firing to move forwardly and drive the inside flange of said case annular portion forwardly as a tubular extension of the remaining portions of said case to allow unobstructed ejection of said forward and rearward tubular portions as well as said buckshot.

4. The cartridge according to claim 1, wherein each of said forward and rearward tubular portions has an axial dimension that is a multiple of its radial dimension with respect to said axis; said annular portion tightly engaging the entire radial exterior surface of said forward and rearward tubular portions, said forward tubular portion forward end and said forward tubular portion radial inside surface.

5. The cartridge of claim 1, wherein said web portion has a pattern of weakened and reinforced portions forming means for breaking said web portion into a plurality of pieces of predetermined size and shape upon firing.

6. The cartridge of claim 5, wherein said weakened and reinforced portions also constitute raised marking means for identifying the cartridge by touch.

7. The cartridge of claim 6, including stress concentrating means for separating said web portion from said forward and rearward tubular portions upon firing to move forwardly and drive the inside flange of said case annular portion forwardly as a tubular extension of the remaining portions of said case to allow unobstructed ejection of said forward and rearward tubular portions as well as said buckshot.

8. The cartridge according to claim 7, wherein each of said forward and rearward tubular portions has an axial dimension that is a multiple of its radial dimension with respect to said axis; and said annular portion tightly engaging the entire radial exterior surface of said forward and rearward tubular portions, said forward tubular portion forward end and said forward tubular portion radial inside surface.

9. The cartridge according to claim 7, wherein said disk is constructed of high impact resistant thermo plastic polystyrene.

References Cited

UNITED STATES PATENTS

| | | | |
|---|---|---|---|
| 2,842,057 | 7/1958 | Dunn | 102—42 |

FOREIGN PATENTS

| | | |
|---|---|---|
| 506,372 | 10/1951 | Belgium. |
| 1,009,415 | 3/1952 | France. |
| 1,051,698 | 9/1953 | France. |
| 1,094,753 | 12/1954 | France. |
| 1,105,279 | 6/1955 | France. |
| 306,674 | 4/1955 | Switzerland. |

BENJAMIN A. BORCHELT, *Primary Examiner.*

ROBERT F. STAHL, *Examiner.*

UNITED STATES PATENT OFFICE

CERTIFICATE OF CORRECTION

Patent No. 3,352,239 November 14, 1967

Thomas Schinnerer et al.

It is hereby certified that error appears in the above numbered patent requiring correction and that the said Letters Patent should read as corrected below.

In the heading to the printed specification, between lines 9 and 10, insert the following:

Claims priority, application Germany, Sept. 12, 1964, D 45,393

Signed and sealed this 17th day of December 1968.

(SEAL)

·st:

Edward M. Fletcher, Jr.

Attesting Officer

EDWARD J. BRENNER

Commissioner of Patents